(12) United States Patent
Rao et al.

(10) Patent No.: US 9,566,916 B2
(45) Date of Patent: Feb. 14, 2017

(54) HYBRID ELECTRIC VEHICLE POWER-UP SEQUENCING WITH VVC TEST

(71) Applicant: FORD GLOBAL TECHNOLOGIES, LLC, Dearborn, MI (US)

(72) Inventors: Balakrishna Rao, Canton, MI (US); Rimma Isayeva, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 795 days.

(21) Appl. No.: 13/793,472

(22) Filed: Mar. 11, 2013

(65) Prior Publication Data
US 2014/0252849 A1 Sep. 11, 2014

(51) Int. Cl.
*B60R 16/02* (2006.01)
*B60K 6/365* (2007.10)
(Continued)

(52) U.S. Cl.
CPC ............... *B60R 16/02* (2013.01); *B60K 6/365* (2013.01); *B60K 6/445* (2013.01); *B60L 3/003* (2013.01);
(Continued)

(58) Field of Classification Search
CPC ............ Y02T 10/7005; Y02T 10/7077; Y02T 10/6217; Y02T 10/6239; Y02T 10/645; Y02T 10/7022; Y02T 10/7072; Y02T 10/7216; Y02T 10/7241; Y02T 10/7275; Y02T 90/127; Y02T 90/14; Y02T 90/34; Y02T 10/6286; B60R 16/03; B60R 16/0315; B60R 16/02; B60L 11/14; B60L 2240/423; B60L 2240/441; B60L 2240/443; B60L 2240/486; B60L 2240/547; B60L 2240/549; B60L 11/005; B60L 11/123; B60L 11/1816; B60L 11/1887; B60L 15/2009; B60L 15/2072; B60L 3/003; B60L 3/0046; B60L 3/04; B60L 7/14; B60L 2210/10; B60L 2210/40; B60L 2240/12; B60L 2240/421; B60W 10/00; B60W 20/00; B60W 10/08; B60W 10/06; B60K 6/365; B60K 6/445; Y02E 60/12; H02J 7/0031; H02J 2007/004; H02J 2007/0037; H01M 10/48
(Continued)

(56) References Cited

U.S. PATENT DOCUMENTS 4,426,611 A * 1/1984 Espelage ............. H02M 5/4505
318/798
5,414,339 A * 5/1995 Masaki ................... B60L 3/003
318/139
(Continued)

*Primary Examiner* — Thienvu Tran
*Assistant Examiner* — Brian K Baxter
(74) *Attorney, Agent, or Firm* — David B. Kelley; Brooks Kushman P.C.

(57) ABSTRACT

A method for operating a hybrid electric vehicle having a variable voltage converter (VVC) includes commanding a first voltage across a VVC in response to a signal requesting a VVC test, continuously monitoring a first VVC voltage difference over a first calibratable time period, and generating a diagnostic signal if the first voltage difference exceeds a first calibratable threshold for the duration of a first calibratable time period. The method further includes, in response to the first voltage difference dropping below the first calibratable threshold, commanding a second voltage across the VVC, continuously monitoring a second VVC voltage difference over a second calibratable time period, generating a diagnostic signal if the second voltage difference exceeds a second calibratable threshold for the duration of a second calibratable time period, and signaling a test pass
(Continued)

in response to the second voltage difference dropping below the second calibratable threshold.

13 Claims, 4 Drawing Sheets

(51) Int. Cl.
| | |
|---|---|
| *B60K 6/445* | (2007.10) |
| *B60L 3/00* | (2006.01) |
| *B60L 3/04* | (2006.01) |
| *B60L 7/14* | (2006.01) |
| *B60L 11/00* | (2006.01) |
| *B60L 11/12* | (2006.01) |
| *B60L 11/14* | (2006.01) |
| *B60L 11/18* | (2006.01) |
| *B60L 15/20* | (2006.01) |

(52) U.S. Cl.
CPC .............. *B60L 3/0046* (2013.01); *B60L 3/04* (2013.01); *B60L 7/14* (2013.01); *B60L 11/005* (2013.01); *B60L 11/123* (2013.01); *B60L 11/14* (2013.01); *B60L 11/1816* (2013.01); *B60L 11/1887* (2013.01); *B60L 15/2009* (2013.01); *B60L 15/2072* (2013.01); *B60L 2210/10* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/547* (2013.01); *B60L 2240/549* (2013.01); *Y02T 10/6217* (2013.01); *Y02T 10/6239* (2013.01); *Y02T 10/645* (2013.01); *Y02T 10/7022* (2013.01); *Y02T 10/7072* (2013.01); *Y02T 10/7077* (2013.01); *Y02T 10/7216* (2013.01); *Y02T 10/7241* (2013.01); *Y02T 10/7275* (2013.01); *Y02T 90/127* (2013.01); *Y02T 90/14* (2013.01); *Y02T 90/34* (2013.01)

(58) Field of Classification Search
USPC .......... 307/9.1; 701/22; 180/65.285; 320/134
See application file for complete search history.

(56) References Cited

U.S. PATENT DOCUMENTS

| | | | |
|---|---|---|---|
| 5,793,189 A * | 8/1998 | Kawaguchi | B60L 11/1859 320/125 |
| 6,331,365 B1 * | 12/2001 | King | B60L 11/1803 320/103 |
| 8,390,145 B2 * | 3/2013 | Harding | B60R 16/033 307/10.1 |
| 2006/0110655 A1 * | 5/2006 | Wirdel | B60L 3/003 429/61 |
| 2007/0120530 A1 * | 5/2007 | Nozaki | B60L 3/0046 320/130 |
| 2007/0229010 A1 * | 10/2007 | Tsuji | H02P 21/06 318/432 |
| 2009/0103341 A1 * | 4/2009 | Lee | H02J 7/022 363/124 |
| 2009/0140745 A1 | 6/2009 | Williams et al. | |
| 2009/0160381 A1 * | 6/2009 | Imura | H02P 21/0003 318/400.15 |
| 2009/0200970 A1 * | 8/2009 | Kimura | H02M 3/1582 318/400.3 |
| 2009/0322264 A1 * | 12/2009 | Imura | B60L 15/025 318/400.09 |
| 2010/0141201 A1 * | 6/2010 | Littrell | H02J 7/35 320/101 |
| 2010/0244558 A1 * | 9/2010 | Mitsutani | B60K 6/365 307/9.1 |
| 2010/0289336 A1 * | 11/2010 | Sugita | H02J 7/1423 307/66 |
| 2011/0095603 A1 * | 4/2011 | Lee | B60L 11/1803 307/10.1 |
| 2011/0170318 A1 * | 7/2011 | Chen | B60L 11/123 363/16 |
| 2012/0013182 A1 * | 1/2012 | Minegishi | B60K 6/445 307/9.1 |
| 2012/0019231 A1 * | 1/2012 | Chen | H02M 3/155 323/312 |
| 2012/0049774 A1 * | 3/2012 | Takamatsu | B60L 11/1803 318/400.3 |
| 2012/0261982 A1 * | 10/2012 | Wanke | B60L 1/006 307/9.1 |
| 2013/0119898 A1 * | 5/2013 | Ohkura | B60L 3/0046 318/139 |
| 2014/0084828 A1 * | 3/2014 | Yamamoto | H02M 1/32 318/400.22 |

\* cited by examiner

HYBRID ELECTRIC VEHICLE POWER-UP SEQUENCING WITH VVC TEST

TECHNICAL FIELD

This disclosure relates to power-up sequences that include variable voltage converter tests, for use in powertrains for hybrid electric vehicles.

BACKGROUND

Hybrid electric vehicles (HEVs) include an internal combustion engine and one or more electric machines, wherein the energy source for the engine is fuel and the energy source for the electric machine is a battery. In a HEV, the engine is the main source of energy for vehicle propulsion with the battery providing supplemental energy for vehicle propulsion. The battery buffers fuel energy and recovers kinematic energy in electric form. Plug-in hybrid electric vehicles (PHEVs) are like HEVs, but have a larger capacity battery that is rechargeable from an external electric grid. In a PHEV, the battery is the main source of energy for vehicle propulsion until the battery depletes to a low energy level, at which time the PHEV operates like a HEV for vehicle propulsion.

Electric Vehicles may include a direct current (DC) voltage converter connected between the battery and the electric machine. Such a voltage converter increases or boosts the voltage potential of the electrical power provided to the electric machine and facilitates torque capability optimization. The electric vehicle may also include an inverter connected between the DC voltage converter and the electric machine, when the electric machine is an alternating current (AC) motor. In the event of a voltage converter failure during a drive cycle, an electric vehicle will experience a shutdown. This behavior, if experienced, reduces customer satisfaction.

SUMMARY

A method and system for operating a vehicle having a variable voltage converter (VVC) includes commanding a first voltage across the VVC in response to a start request and to a limited operation mode being available. The method additionally includes commanding a second voltage across the VVC in response to a voltage difference between the first voltage and a measured VVC voltage falling below a threshold. If the voltage difference exceeds the threshold for a designated time period, then a diagnostic signal is generated.

In some embodiments, the first commanded voltage is greater than a measured battery voltage. In such an embodiment, when the voltage difference falls below the threshold, a second voltage equal to the battery voltage is commanded across the VVC. If the voltage difference between the second voltage and the measured VVC voltage exceeds a second threshold for a designated time period, then a diagnostic signal is generated. If the voltage difference falls below the second threshold, then a test pass is signaled.

In some embodiments, the limited operation mode is enabled if a diagnostic signal is generated. In other embodiments, the method further comprises isolating the VVC from at least one electric machine, which may be performed by opening at least one insulated-gate bipolar transistor (IGBT). In some embodiments, the test may be aborted in response to one of a signal indicating the presence of a sensor anomaly and a signal indicating that at least one switch in the VVC may not be switched. If the test is aborted in such a fashion, then the limited operation mode is enabled. In another embodiment, the test may be aborted in response to a signal indicating that the limited operation mode has been enabled.

In one embodiment, a vehicle system for testing a VVC is provided, the system comprising an electronic control unit and a VVC connected between a battery and at least one electric machine. The electronic control unit is configured to isolate the VVC from the at least one electric machine, command a voltage across the VVC, monitor a voltage difference between the commanded voltage and a measured VVC voltage, and generate a diagnostic signal if the VVC voltage difference exceeds an associated threshold for a calibratable time period.

In some embodiments, the electronic control unit is further configured to detect a vehicle start request. The electronic control unit may also be configured to detect a signal that a limited operation mode is available. The electronic control unit may also be configured to abort the test in response to a signal that a limited operation mode is activated. The electronic control unit may also be configured to abort the test in response to a signal indicating the presence of a sensor anomaly or to a signal indicating that at least one switch in the VVC may not be switched. In some embodiments, the voltage commanded by the electronic control unit is greater than a measured battery voltage. In such an embodiment, the electronic control unit may be further configured to, in response to the voltage difference dropping below the associated threshold, command a second voltage across the VVC, the second voltage being equal to the measured battery voltage, to monitor a second voltage difference between the second commanded voltage and the measured VVC voltage, and to generate a diagnostic signal if the second VVC voltage difference exceeds a second threshold for a second calibratable time period. In such an embodiment, the electronic control unit may be further configured to signal a test pass when the second voltage difference drops below the second threshold.

In one embodiment, a method for operating a HEV having a VVC includes commanding a first voltage across a VVC in response to a signal requesting a VVC test, continuously monitoring a first VVC voltage difference over a first calibratable time period, and generating a diagnostic signal if the first voltage difference exceeds a first calibratable threshold for the duration of a first calibratable time period. The method further includes, in response to the first voltage difference dropping below the first calibratable threshold, commanding a second voltage across the VVC, continuously monitoring a second VVC voltage difference over a second calibratable time period, generating a diagnostic signal if the second voltage difference exceeds a second calibratable threshold for the duration of a second calibratable time period, and signaling a test pass in response to the second voltage difference dropping below the second calibratable threshold.

Embodiments according the present disclosure provide a number of advantages. For example, the present disclosure provides a test strategy that can generate diagnostic signals in response to a VVC self-test and implement a LOS driving mode, in which the vehicle may still be safely operated. Furthermore, the test strategy disclosed herein is faster than earlier methods because there is no predetermined voltage settling period.

DETAILED DESCRIPTION

As those of ordinary skill in the art will understand, various features of the present invention as illustrated and described with reference to any one of the Figures may be combined with features illustrated in one or more other Figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations.

A voltage converter should be tested upon vehicle start to ensure proper electric drive operation. One method for testing the voltage converter at vehicle start, described in co-pending U.S. patent application Ser. No. 13/537,123, involves applying a commanded voltage, waiting a calibrated "settling" period, and then measuring a voltage across the voltage converter. If the difference between the commanded and measured voltage exceeds a threshold, then the vehicle will not be started. This method is relatively time-consuming, however, due to the pre-determined settling period prior to voltage measurements. Methods according to the present disclosure provide various advantages as will be described below.

Figure 1:
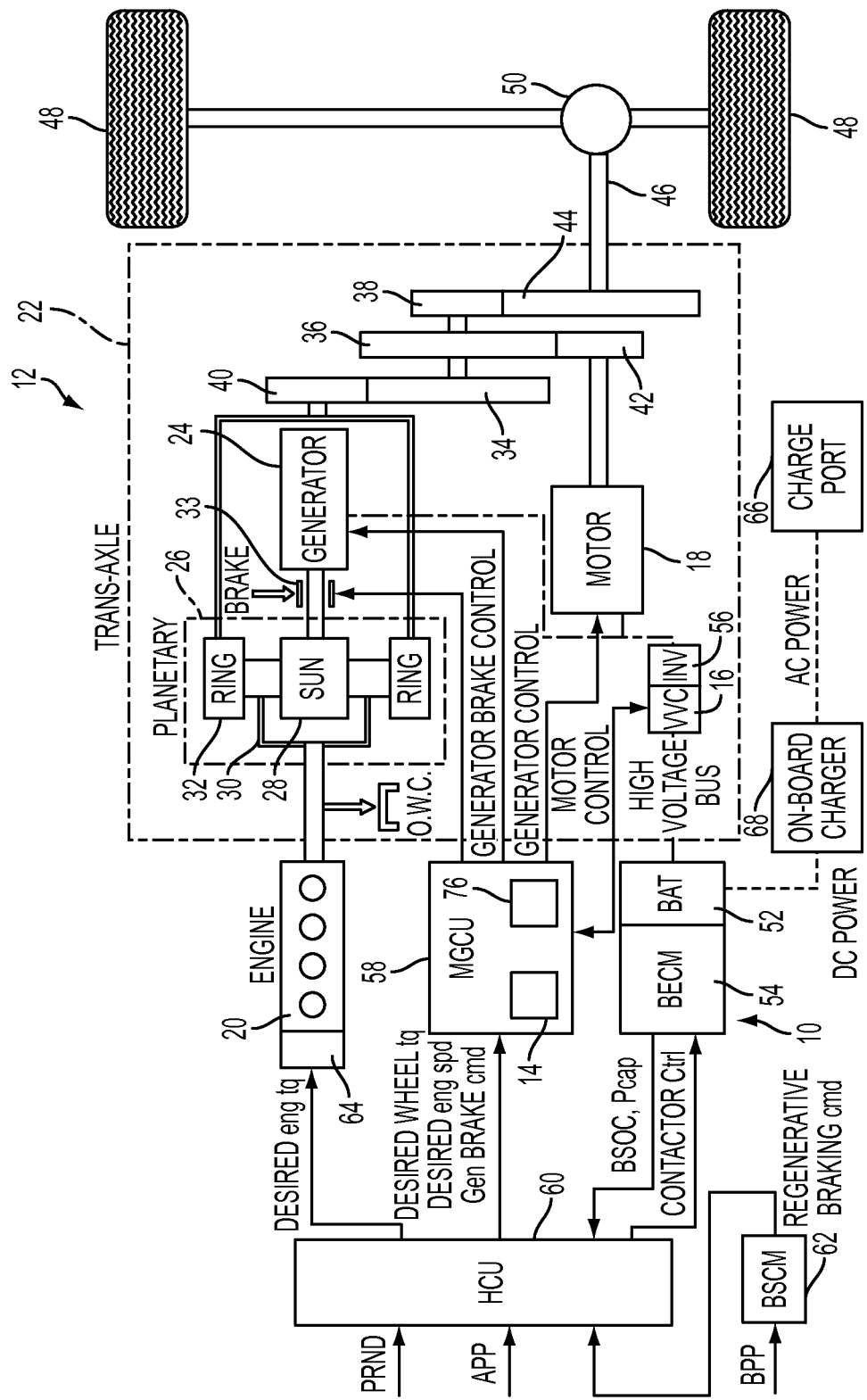
FIG. 1 is a schematic diagram of a vehicle, illustrated with a vehicle system for evaluating the performance of a variable voltage converter (VVC) according to the present disclosure.

With reference to FIG. 1, a vehicle system for evaluating the performance of a variable voltage converter (VVC) of an electric vehicle is illustrated in accordance with one or more embodiments and is generally referenced by numeral 10. The vehicle system 10 is depicted within a vehicle 12. The vehicle system 10 includes a controller 14 and a VVC 16 that are in communication with each other. The controller 14 receives input signals that represent voltage and current measurements of the VVC 16 and evaluates the performance of the VVC 16 before power is provided for vehicle propulsion.

The illustrated embodiment depicts the vehicle 12 as an HEV, which is an electric vehicle propelled by an electric machine 18 with assistance from an internal combustion engine 20. The electric machine 18 is an AC electric motor according to one or more embodiments, and depicted as the "motor" 18 in FIG. 1. The electric machine 18 receives electrical power and provides drive torque for vehicle propulsion. The electric machine 18 also functions as a generator for converting mechanical power into electrical power through regenerative braking.

The vehicle 12 includes a transmission 22 having a power-split configuration, according to one or more embodiments. The transmission 22 includes the first electric machine 18 and a second electric machine 24. The second electric machine 24 is an AC electric motor according to one or more embodiments, and depicted as the "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 22.

The transmission 22 includes a planetary gear unit 26, which includes a sun gear 28, a planet carrier 30 and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 22 also includes a one-way clutch (O.W.C.) and a generator brake 33, according to one or more embodiments. The O.W.C. is coupled to the output shaft of the engine 20 to only allow the output shaft to rotate in one direction. The O.W.C. prevents the transmission 22 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. In other embodiments, the O.W.C. and the generator brake 33 are eliminated, and replaced by control strategies for the engine 20 and the second electric machine 24.

The transmission 22 includes a countershaft having a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a transmission output shaft 46. The transmission output shaft 46 is coupled to a pair of driven wheels 48 through a differential 50. The transmission output gear 44 meshes with the third gear 38 for transferring torque between the transmission 22 and the driven wheels 48.

Although illustrated and described in the context of an HEV 12, it is understood that embodiments of the vehicle system 10 may be implemented on other types of electric vehicles, such as a battery electric vehicle (BEV), which is powered by an electric machine without assistance of an internal combustion engine.

The vehicle 12 includes a battery 52 for storing electrical energy. The battery 52 is a traction battery, a high voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 12 contemplate different types of energy storage devices, such as capacitors and fuel cells (not shown) that supplement or replace the battery 52. A high voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output that is indicative of the battery state of charge and the battery power capability to other vehicle systems and controllers.

The transmission 22 includes the VVC 16 and an inverter 56. The VVC 16 and the inverter 56 are electrically connected between the main battery 52 and the first electric machine 18; and between the battery 52 and the second electric machine 24. The VVC 16 boosts or "steps up" the voltage potential of the electrical power provided by the battery 52. The inverter 56 inverts the DC power supplied by the main battery 52 (through the VVC 16) to AC power for operating the electric machines 18, 24. The inverter 56 also rectifies AC power provided by the electric machines 18, 24, to DC for charging the main battery 52.

The transmission 22 includes a Motor Generator Control Unit (MGCU) 58 for controlling the electric machines 18, 24, the VVC 16 and the inverter 56. The MGCU 58 includes the controller 14, which is configured to monitor, among other things, the position, speed, and power consumption of the electric machines 18, 24. The controller 14 also monitors electrical parameters (e.g., voltage and current) at various locations within the VVC 16 and the inverter 56. The MGCU 58 provides output signals corresponding to this information to other vehicle systems.

The vehicle 12 includes a hybrid control unit (HCU) 60 that communicates with other vehicle systems and controllers for coordinating their function. Although it is shown as a single controller, the HCU 60 may include multiple controllers that may be used to control multiple vehicle systems according to an overall vehicle control logic, or software.

The vehicle controllers, including the HCU 60 and the controller 14 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The HCU 60 communicates with other vehicle systems and controllers (e.g., the BECM 54 and the MGCU 58) over one or more hardline vehicle connections using common bus protocols (e.g., CAN and LIN). The HCU 60 receives input (PRND) that represents a current position of the transmission 22 (e.g., park, reverse, neutral or drive). The HCU 60 also receives input that represents an accelerator pedal position. The HCU 60 provides output that represents a desired wheel torque, desired engine speed, and generator brake command to the MGCU 58; and contactor control to the BECM 54.

The vehicle 12 includes a braking system (not shown) which includes a brake pedal, a booster, a master cylinder, as well as mechanical connections to the driven wheels 48, to effect friction braking. The braking system also includes position sensors, pressure sensors, or some combination thereof for providing information such as brake pedal position that corresponds to a driver request for brake torque. The braking system also includes a brake system control module (BSCM) 62 that communicates with the HCU 60 to coordinate regenerative braking and friction braking. The BSCM 62 provides a regenerative braking command to the HCU 60, according to one embodiment.

The vehicle 12 includes an engine control module (ECM) 64 for controlling the engine 20. The HCU 60 provides output (desired engine torque) to the ECM 64 that is based on a number of input signals including APP, and corresponds to a driver's request for vehicle propulsion.

The vehicle 12 is configured as a plug-in hybrid electric vehicle (PHEV) according to one or more embodiments. The battery 52 periodically receives AC energy from an external power supply or grid, via a charge port 66. The vehicle 12 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging.

The vehicle 12 is equipped with a limited operating strategy ("LOS") driving mode. An LOS mode of operation is a reduced power drive mode that provides partial vehicle performance, and it may be activated when a diagnostic signal is present. The LOS mode may enable vehicle operation at a range of reduced speeds depending on the type of diagnostic signal that is present. In vehicles that are not equipped with an LOS mode, the vehicle would not be driveable if such a diagnostic signal were produced. The HCU 60 provides a signal indicating that the LOS mode is available in response to diagnostics of various other vehicle systems. The MGCU 58 generates a control signal (LOS_OK) in response to the signal from the HCU and further in response to a VVC status check.

Figure 2:
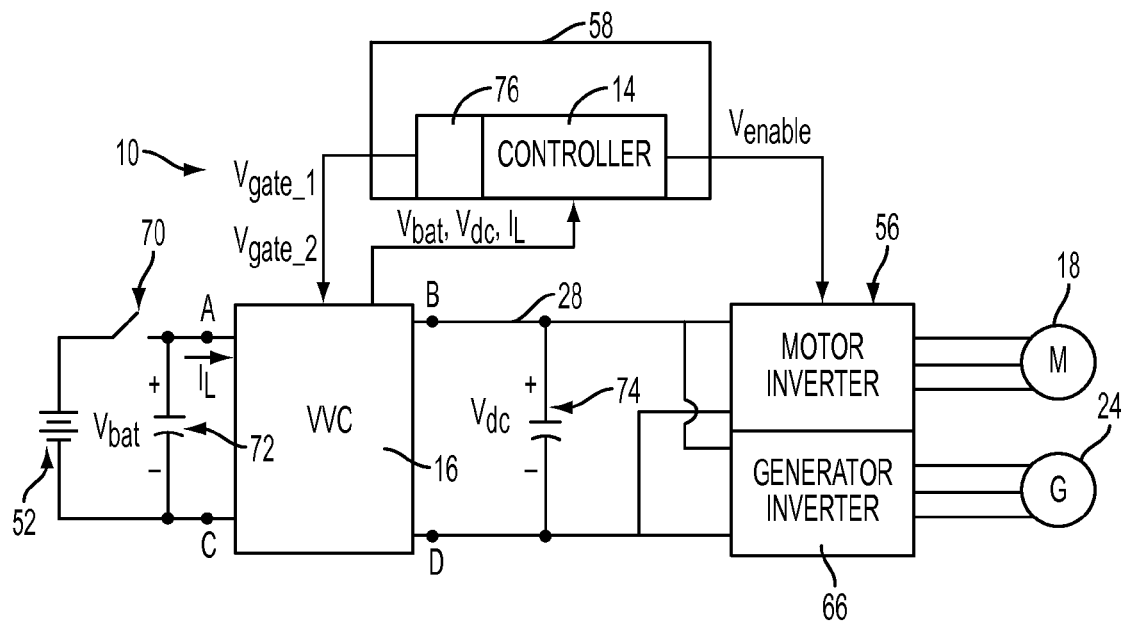
FIG. 2 is an enlarged schematic view of the vehicle system of FIG. 1.

With reference to FIG. 2, the VVC 16 boosts or "steps up" the voltage potential of the electrical power provided by the main battery 52. The main battery 52 provides high voltage (HV) DC power. A contactor 70 is connected in series between the main battery 52 and the VVC 16. When the contactor 70 is closed, the HV DC power may be transferred from the main battery 52 to the VVC 16. An input capacitor 72 is connected in parallel to the main battery 52. The input capacitor 72 stabilizes the bus voltage and reduces any voltage and current ripple. The VVC 16 receives the HV DC power and boosts or "steps up" the voltage potential of the input voltage.

The inverter 56 inverts/rectifies the electrical power between AC and DC. An output capacitor 74 is connected in parallel to the VVC 16 and the inverter 56. The output capacitor 74 stabilizes bus voltage and reduces voltage and current ripple. The inverter 56 includes a bi-directional circuit (not shown) with a series of switches oriented in a three-phase configuration in one or more embodiments. The inverter 56 includes separate circuitry for controlling each of the first electric machine 18 and the second electric machine 24, which is generally depicted as two inverters in FIG. 2.

The vehicle system 10 includes sensors (not shown) for measuring electrical parameters of the VVC 16. A first voltage sensor (not shown) measures the voltage of the main battery 52 and provides a corresponding input signal ($V_{bat}$) to the MGCU 58. In one or more embodiments, the first voltage sensor measures the voltage across the input capacitor 72, which corresponds to the main battery voltage ($V_{bat}$).

A second voltage sensor (not shown) measures the output voltage of the VVC 16 and provides a corresponding input signal ($V_{dc}$) to the MGCU 58. In one or more embodiments, the second voltage sensor measures the voltage across the output capacitor 74, which corresponds to the DC bus voltage. A current sensor (not shown) measures the input current supplied to the VVC 16 and provides a corresponding input signal ($I_L$) to the MGCU 58.

The MGCU 58 controls the output voltage of the VVC 16. The MGCU 58 includes the controller 14 and a gate drive circuit 76. The controller 14 receives input from the HCU 60 and other controllers, and determines a desired output voltage of the VVC 16. The controller 14 then provides control signals ($V_{gate}$) to the gate drive circuit 76 that correspond to an output voltage command ($V_{cmd}$). The gate drive circuit 76 amplifies the control signals ($V_{gate}$) and provides amplified control signals ($V_{gate\_1}$, $V_{gate\_2}$) to the VVC 16. The controller 14 monitors the input signals ($V_{bat}$, $V_{dc}$, $I_L$) in response to $V_{gate\_1}$, $V_{gate\_2}$ to evaluate the performance of the VVC 16.

The MGCU 58 controls the AC voltage provided to the electric machines 18, 24 by providing a control signal ($V_{enable}$) to the inverter 56 and by controlling $V_{dc}$. The inverter 56 includes a series of switches (not shown), which may be integrated gate bipolar transistors (IGBTs). The control signal ($V_{enable}$) includes a gate signal that is provided to each switch for controlling their operation. The MGCU 58 is configured to disable the first electric machine 18 and the second electric machine 24 (e.g., by opening the switches within the inverter 56) during evaluation of the VVC 16 to prevent torque production, according to one or more embodiments.

Figure 3:
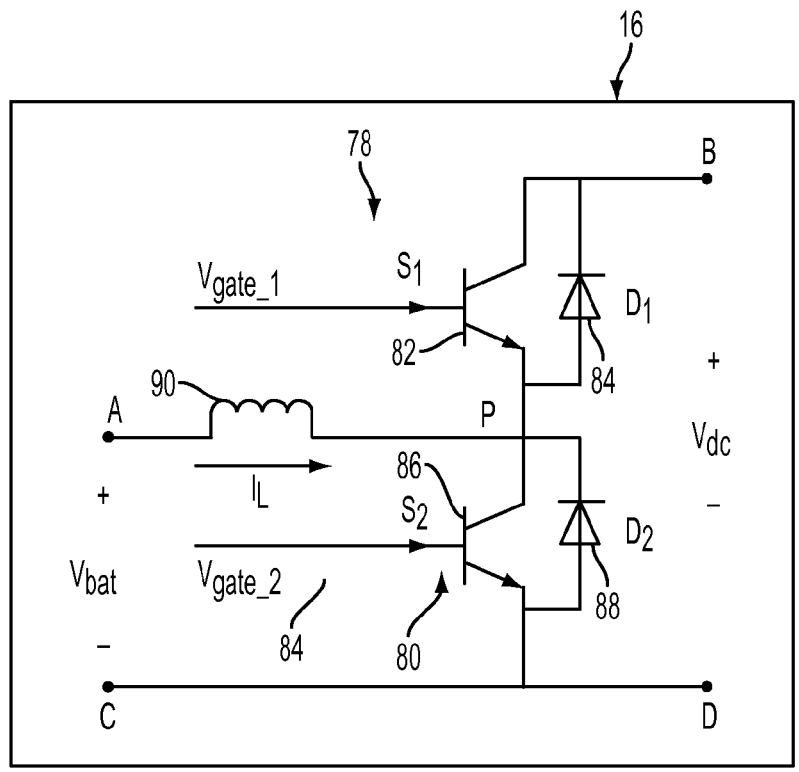
FIG. 3 is a circuit diagram of the VVC of FIGS. 1 and 2, a first switching unit and a second switching unit.

Referring to FIG. 3, the VVC 16 includes a first switching unit 78 and a second switching unit 80 for boosting the input voltage ($V_{bat}$) to provide output voltage ($V_{dc}$). The first switching unit 78 includes a first transistor 82 connected in parallel to a first diode 84, but with their polarities switched (anti-parallel). The second switching unit 80 includes a second transistor 86 connected anti-parallel to a second diode 88. Each transistor 82, 86 may be any type of controllable switch (e.g., an IGBT or field-effect transistor (FET)). Additionally, each transistor 82, 86 is individually controlled by the MGCU 58. An input inductor 90 is connected in series between the main battery 52 and the switching units 78, 80. The input inductor 90 charges the output capacitor 74.

The MGCU 58 controls the output voltage ($V_{dc}$) of the VVC 16. The gate drive circuit 76 provides a control signal ($V_{gate}$) to each transistor 82, 86 that is based on $V_{cmd}$. The gate drive circuit 76 is configured to provide gate signals that correspond to a specific type of voltage change or response at $V_{dc}$ (e.g., a step response, or a ramp response). In one or more embodiments, the transistors 82, 86 are configured to open in response to a high voltage gate signal, and close in response to a low voltage gate signal.

With reference to FIGS. 1-3, the vehicle 12 includes a plurality of controllers (e.g., the HCU 60, the controller 14, the BECM 54, etc.). These vehicle controllers perform a series of tests at vehicle start up, before allowing vehicle propulsion. These tests may be initiated by an input signal, such as "KEY_ON". The KEY_ON signal is generated when the driver turns a key (not shown) to an "on" position (or starts the vehicle 12 by some other procedure). Some tests may be run simultaneously, however other tests are run in series. Therefore, the tests are performed quickly to avoid delaying vehicle propulsion.

Figure 4:
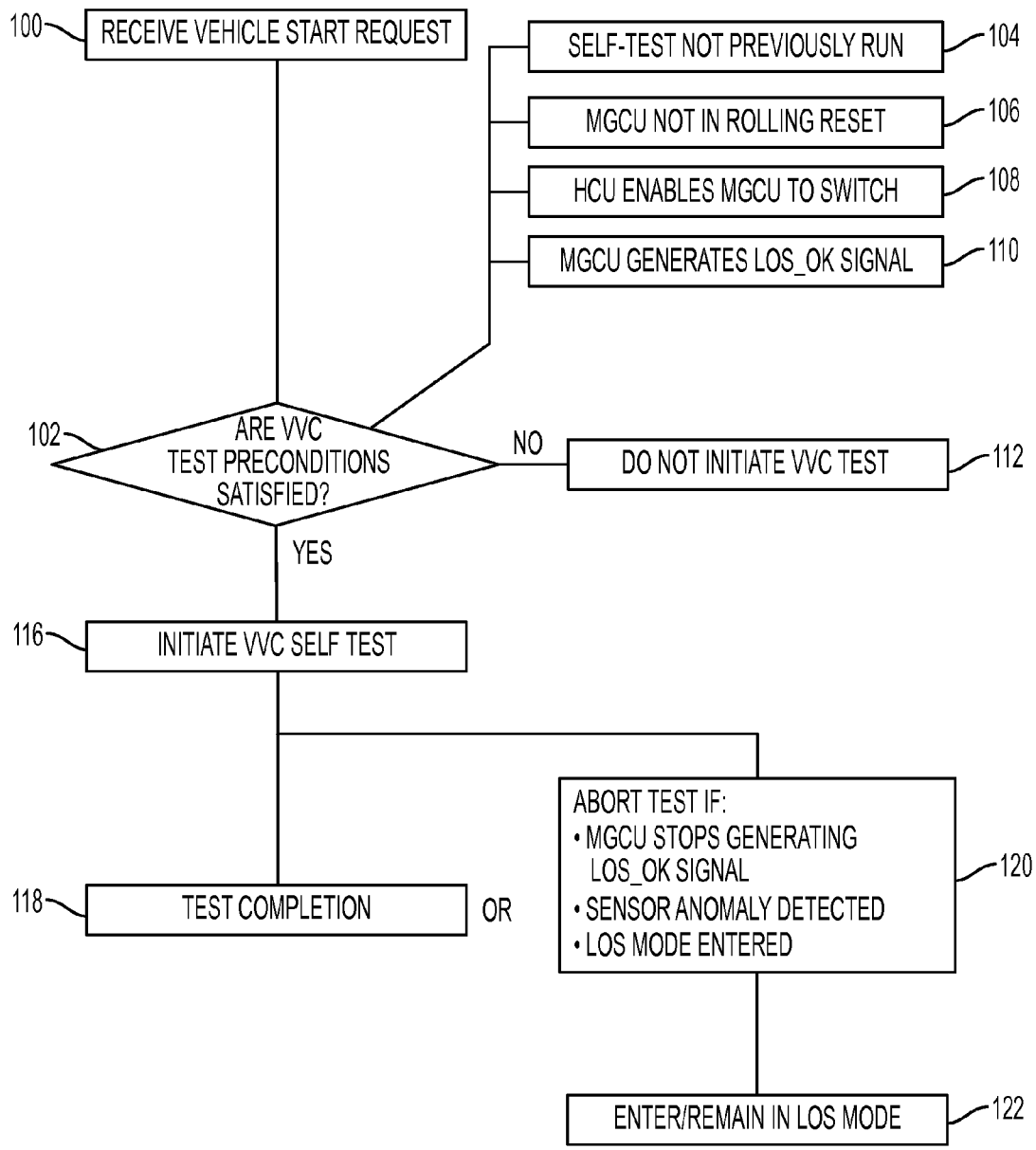
FIG. 4 is a flowchart illustrating VVC self-test preconditions and abort conditions according to the present disclosure.

Referring now to FIG. 4, the vehicle system 10 may perform a self-test of the VVC 16 at vehicle startup. A vehicle start request is received, as illustrated by block 100. A determination is then made of whether the preconditions to initiating a VVC self-test are satisfied, as illustrated by block 102, in conjunction with the list of preconditions represented by blocks 104-110.

Various conditions must be satisfied prior to initiating a VVC self-test, including at least the following. The VVC self-test must not have previously been run, as indicated by block 104. The MGCU 58 must not be going through a rolling reset, as indicated by block 106. If the MGCU 58 is in a rolling reset, the MGCU 58 cannot initiate or control the self-test. The HCU 60 must have enabled the MGCU 58 to switch, as indicated by block 106. This occurs when HCU 60 has determined that the battery side contactor is closed after pre-charging and the DC bus voltage has reached the level where the devices can start switching. The MGCU 58 must be generating an "LOS_OK" signal in response to the signal from the HCU and the VVC status check. If any of these conditions are not satisfied, then the algorithm may wait a calibratable time, and then re-evaluate whether the conditions are satisfied. The calibratable time may be, for example, 100 ms.

If any of the test preconditions are not satisfied, then the VVC self-test is not initiated, as illustrated by box 112. In some embodiments, the algorithm may wait a calibratable time, and then re-evaluate whether the conditions are satisfied. The calibratable time may be, for example, 100 ms. If the test preconditions are satisfied, then the VVC self-test is initiated, as illustrated by block 116. The test will be described in detail below in conjunction with FIG. 5.

After initiating the test, the test may complete successfully, as indicated by block 118. A successful test completion may result in the MGCU 58 generating either a "test pass" flag or a diagnostic signal, as described below with respect to FIG. 5. However, the test may be aborted in response to various conditions, as illustrated by block 120. The test will be aborted if the MGCU 58 stops generating an LOS_OK signal. This may occur in response to a signal from the HCU 60 that the switches in the VVC may no longer be switched, or if internal VVC diagnostics indicate that the switches may no longer be switched. The test will also be aborted in response to a signal of a sensor anomaly. This may be an anomaly in the VVC 16, HCU 60, MGCU 58, or other system that may affect the VVC operation. The test will also be aborted if the LOS mode is activated by another vehicle subsystem.

If the test is aborted for any of the above reasons, then an LOS mode is activated as indicated in block 122. This may be performed by a signal from HCU 60. In this fashion, the vehicle may still be operated in a reduced power mode instead of being incapable of movement. If the test was aborted due to activation of the LOS mode based on conditions external to the VVC test, then the vehicle will remain in LOS mode.

Figure 5:
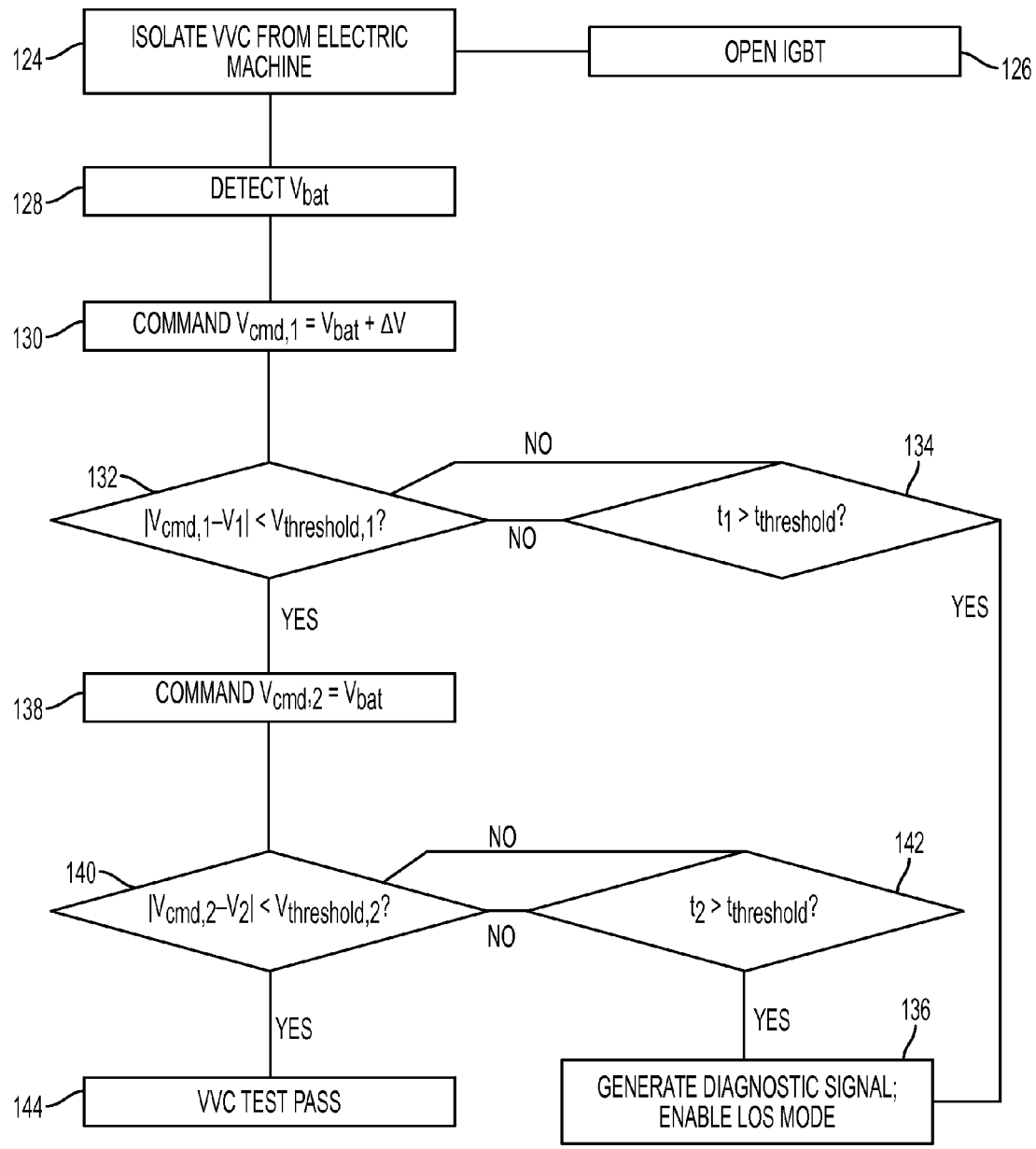
FIG. 5 is a flowchart illustrating an embodiment of a test method according to the present disclosure.

Referring now to FIG. 5, the VVC self-test process will be described. The VVC is isolated from at least one electric machine, as illustrated in block 124. This may be performed by opening at least one IGBT, as illustrated in block 126. In one embodiment, all of the IGBTs in the VVC are opened. A battery voltage $V_{bat}$ is detected, as illustrated in block 128. At test start time $t_1=0$, the MGCU 58 commands the VVC 16 to provide a boost voltage $V_{cmd,1}$, as illustrated in block 130. The MGCU 58 provides control signals to the VVC 16 that correspond to a voltage command value that is greater than the battery voltage by a predetermined voltage difference ($V_{cmd,1}=V_{bat}+\Delta V$). A VVC voltage $V_1$ is measured, and the difference $|V_{cmd,1}-V_1|$ is compared to a threshold voltage $V_{threshold,1}$, as illustrated by operation 132.

If the voltage difference is not less than the threshold, then a determination is made of whether the elapsed test time $t_1$ exceeds a test time threshold $t_{threshold}$, as illustrated by operation 134. If the elapsed test time does not exceed the threshold time, then the algorithm returns to operation 132 and again compares the voltage difference to the voltage threshold. If a determination is made that the elapsed time has exceeded the test time threshold, meaning the test has "timed out", then a diagnostic signal is generated and the LOS mode is activated, as illustrated by block 136.

Returning to operation 132, if a determination is made that the voltage difference is less than the voltage threshold, then at a second test start time $t_2=0$ the MGCU 58 commands the VVC 16 to provide a second boost voltage $V_{cmd,2}$ that is equal to the battery voltage $V_{bat}$, as illustrated in block 138. A second VVC voltage $V_2$ is measured, and the difference $|V_{cmd,2}-V_2|$ is compared to a second threshold voltage $V_{threshold,2}$, as illustrated by operation 140.

If the voltage difference is not less than the threshold, then a determination is made of whether the elapsed test time $t_2$ exceeds a test time threshold $t_{threshold}$, as illustrated by operation 142. If the elapsed test time does not exceed the threshold time, then the algorithm returns to operation 140 and again compares the voltage difference to the voltage threshold. If a determination is made that the elapsed time has exceeded the test time threshold, then a diagnostic signal is generated and the LOS mode is activated, as illustrated by block 136.

Returning to operation 140, if a determination is made that the voltage difference is less than the second voltage threshold, then a signal is generated indicating that the VVC test passed, as illustrated in block 144.

As can be seen from the various embodiments, the present invention provides a test strategy that can generate diagnostic signals in response to a VVC self-test and implement a LOS driving mode, in which the vehicle may still be safely operated. Furthermore, the test strategy disclosed herein is faster than earlier methods because there is no predetermined time delay for voltage settling.

While the best mode has been described in detail, those familiar with the art will recognize various alternative designs and embodiments within the scope of the following claims. Additionally, the features of various implementing embodiments may be combined to form further embodiments of the invention. While various embodiments may have been described as providing advantages or being preferred over other embodiments or prior art implementations with respect to one or more desired characteristics, those of ordinary skill in the art will recognize that one or more features or characteristics may be compromised to achieve desired system attributes, which depend on the specific application and implementation. These attributes may include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications.

What is claimed is:

1. A method for operating a vehicle system comprising: isolating a variable voltage converter (VVC) from at least one electric machine; commanding a first voltage exceeding battery voltage across the VVC in response to a start request, and
a second voltage equal to the battery voltage across the VVC in response to a first difference between the first voltage and measured VVC voltage falling below a threshold; and
generating a diagnostic signal if the first or a second difference between the second voltage and measured VVC voltage exceed respective thresholds for respective time periods; signaling a test pass when the second difference falls below the respective second threshold.

2. The method of claim 1, further comprising enabling a limited operation mode if a diagnostic signal is generated.

3. The method of claim 1, wherein isolating the VVC from the at least one electric machine comprises opening at least one insulated-gate bipolar transistor.

4. The method of claim 1, further comprising:
enabling a limited operation mode in response to one of a signal indicating presence of a sensor anomaly and a signal indicating that at least one switch in the VVC may not be switched.

5. A system comprising:
a controller configured to:
isolate a variable voltage converter (VVC) from an electric machine; and
generate a diagnostic signal responsive to first or second differences between first and second commanded voltages and measured voltage across the VVC, respectively, exceeding respective thresholds for respective times, the first commanded voltage equal to, and the second commanded voltage exceeding a measured battery voltage, the second voltage commanded responsive to the first difference falling below the respective threshold.

6. The system of claim 5, wherein the controller is further configured to detect a vehicle start request.

7. The system of claim 5, wherein the controller is further configured to detect a signal that a limited operation mode is available.

8. The system of claim 5, wherein the controller is further configured to activate a limited operation mode in response to a signal indicating the presence of a sensor anomaly or to a signal indicating that at least one switch in the VVC may not be switched.

9. The system of claim 5, wherein the controller is further configured to signal a test pass when the second voltage difference drops below the respective second threshold.

10. A method for operating a hybrid vehicle having a variable voltage converter (VVC), the method comprising:
commanding a first voltage across the VVC in response to a signal requesting a VVC test;
continuously monitoring a first voltage difference between the first commanded voltage and a measured VVC voltage;
generating a diagnostic signal if the first voltage difference exceeds a first calibratable threshold for the duration of a first calibratable time period;
in response to the first voltage difference dropping below the first calibratable threshold, commanding a second voltage across the VVC;
continuously monitoring a second voltage difference between the second commanded voltage and the measured VVC voltage;
generating a diagnostic signal if the second voltage difference exceeds a second calibratable threshold for the duration of a second calibratable time period; and
signaling a test pass in response to the second voltage difference dropping below the second calibratable threshold.

11. The method of claim 10, wherein the commanding a first voltage is further in response to a signal indicating that a reduced power drive mode is available.

12. The method of claim 11, further comprising aborting the test in response to a signal that the reduced power drive mode is activated.

13. The method of claim 10, further comprising isolating the VVC from at least one electric machine.

* * * * *